United States Patent Office 3,519,669
Patented July 7, 1970

---

3,519,669
PROCESS FOR SEPARATING ALUMINUM TRIETHYL FROM OTHER METAL ETHYL COMPOUNDS
Karl Ziegler, 1 Kaiser-Wilhelm-Platz, Mulheim (Ruhr), Germany, and Herbert Lehmkuhl, Mulheim (Ruhr), Germany; said Lehmkuhl assignor to said Ziegler
No Drawing. Continuation of application Ser. No. 40,134, July 1, 1960. This application June 17, 1963, Ser. No. 288,559
Claims priority, application Germany, July 4, 1959, Z 7,406
Int. Cl. C07f 3/00, 7/00, 5/06
U.S. Cl. 260—448                    4 Claims

---

ABSTRACT OF THE DISCLOSURE

A process of separating aluminum triethyl from its admixture with a metal ethyl compound $(C_2H_5)_nM$, wherein M is a metal selected from the group consisting of metals of groups II–V of the Periodic System other than aluminum and $n$ is an integer equal to the valence of said metal M, which comprises contacting said admixture with a member selected from the group consisting of alkali metal cyanides, alkali metal fluorides, and complexes thereof with aluminum triethyl, to form a complex compound of said aluminum triethyl with said alkali metal group member, said metal ethyl compound being sparingly soluble in the complex, and recovering the metal ethyl compound which separates from the aluminum triethyl complex.

---

This application is a continuation application of application Ser. No. 40,134, filed July 1, 1960, now abandoned.

This invention relates to a process for separating aluminum triethyl from other metal ethyl compounds.

When obtaining metal alkyl compounds with the use of electrolytes containing aluminum, as described for example in the U.S. Pat. Nos. 2,985,568 and 3,069,334, is for example, when preparing lead tetraethyl using alkali aluminum tetraethyl as electrolyte, a mixture of lead tetraethyl and aluminum triethyl is formed at the anode, in the molecular ratio of 1:4. The separation of such mixtures of substances, no matter how they are produced can present considerable difficulties. In individual cases, for example when the boiling points of the compounds to be separated are sufficiently far apart, the separation can easily be achieved by distillation. In other cases, especially with a mixture of lead tetraethyl and aluminum triethyl, such distillation cannot be successfully employed because of the similar boiling points of the two compounds. The separation of these two substances is of great industrial importance.

The present invention provides a process for the separation of aluminum triethyl from metal ethyls of the second to fifth group of the Periodic System, such as zinc, cadmium, mercury, indium, gallium, thallium, antimony, bismuth and more especially lead.

The invention makes use of the fact that a phase separation between aluminum triethyl and the other metal ethyl can be produced if the aluminum triethyl is converted into a complex. Thus, lead tetraethyl is for example sparingly soluble in the liquid complex compound $NaF \cdot 2Al(C_2H_5)_3$. Thus, if the aluminum triethyl is transformed into such a complex condition in the mixture which originally only contains metal ethyl compounds not combined in complex form, then a phase separation occurs and it is possible for the metal alkyl compound not combined in complex form, for example lead tetraethyl, to be separated from the phase of the aluminum triethyl complex.

If desired, it is also possible thereafter to recover free aluminum triethyl. For example Pat. No. 2,844,615 describes a process whereby aluminum triethyl can be distilled off from the complex compound $NaF \cdot 2Al(C_2H_5)_3$ by heating in vacuo. Nevertheless, it is only possible in such a case to split off 1 mol of aluminum triethyl with simultaneous formation of the so-called 1:1-complex compound $NaF \cdot Al(C_2H_5)_3$. If it is desired to recover all the aluminum triethyl in a free state, the following possibility is provided: The mixture of for example lead tetraethyl and aluminum triethyl is mixed with the 1:1-complex compound of alkali fluoride, for example sodium fluoride, and aluminum triethyl. In this case, the 1:2-compound is formed, the lead tetraethyl is separated out spontaneously as a bottom layer and can easily be separated. The upper layer can then, by heating, be split up again into the 1:1-compound and aluminum triethyl.

This process can be used with comparatively good success. However, it should be noted that the lead tetraethyl or the other metal alkyls still have a certain solubility in the liquid sodium fluoride-aluminum triethyl complex. Consequently, if it is desired to recover an aluminum triethyl of highest possible purity, the upper layer from the layer separation must also be freed again from the residual metal ethyl from the lower layer by a separate processing step, for example from the residue of lead tetraethyl. This can for example be achieved by an extraction with a hydrocarbon, advantageously a saturated hydrocarbon, for example, a paraffin. In particular, it is however preferred to carry out the thermal splitting in vacuo in two stages without this auxiliary. In this case, the still dissolved lead tetraethyl distills over in the first stage together with some aluminum triethyl. Pure aluminum then appears in the second stage.

The lower the concentration of the metal alkyl not combined in complex form, for example the lead tetraethyl, in the sodium fluoride-aluminum triethyl complex, the less trouble is caused by this procedure. The solubility depends on the temperature. In detail, the following values were found:

| ° C.: | g. $Pb(C_2H_5)_4$/100 cm.$^3$ |
|---|---|
| −15 | 3 |
| 0 | 4.4 |
| +20 | 6.2 |
| +40 | 7.9 |
| +60 | 9.8 |
| +80 | 11.7 |

In order to achieve an effective separation of the two liquid phases, it is thus advisable for the mixture to be cooled as far as possible prior to the phase separation. This possibility of separating out a very large quantity of lead tetraethyl by cooling to a low temperature is however restricted in this case, since the complex aluminum triethyl compound becomes solid at lower temperatures. The solubilities indicated in the table for the lowest temperatures could only be determined in small experiments with supercooling of the aluminum complex compound. These conditions cannot be used industrially, because then the crystallisation of the aluminum triethyl complex compound cannot be prevented.

A very considerable improvement is produced according to the invention if, in an analogous separating process, the alkali fluoride complex compounds of the aluminum triethyl are replaced by corresponding complex compounds with alkali cyanides. For example, the complex compound $NaCN \cdot 2Al(C_2H_5)_3$ can be satisfactorily cooled down to about 20° C. without any danger of solidification. The solubility of lead tetraethyl in this complex compound is only 2.6 g./100 cc. at 20° C., that is to say, less than half the solubility of the lead tetraethyl in the corresponding sodium fluoride complex. It thus becomes possible, when using the alkali cyanide complexes, to obtain the same result or an even better result at room temperature than is possible at −15° C. with the corresponding sodium fluoride complex. It is apparent that in this way the separation is considerably simplified by comparison with the use of the sodium fluoride complexes. This form of the invention is thus characterised by the fact that the aluminum triethyl which is present in admixture with the other metal ethyl compounds is transformed into an alkali cyanide complex, the metal ethyl not combined in complex form and being separated out as a separate phase is isolated and, if necessary, free aluminum triethyl is thereafter split off from the aluminum triethyl-cyanide complex. In particular, it is preferred to use such quantities of cyanide that there are formed in the mixture of the metal ethyl compounds the 1:2-alkali cyanide complexes of aluminum triethyl with the general formula MeCN·2Al($C_2H_5$)$_3$, in which Me represents sodium or potassium. For the production of these complexes, both alkali cyanide and the 1:1-cyanide complex of aluminum triethyl with the general formula MeCN·Al($C_2H_5$)$_3$ can be used.

In this case also, it is preferred according to the invention to cool the two immiscible phases to the lowest possible temperature prior to the separation thereof in order to achieve the lowest possible solubility in the complex aluminum triethyl compound of the metal ethyl compound which is not combined in complex form. If it is desired to separate the two phases from one another in a liquid condition, it is obviously also necessary here to ensure that temperatures are used which are not so low that the complex aluminum compounds crystallise out.

For the separation of the previously described complex aluminum triethyl compounds from the other metal ethyl compounds which are present, however, the presence of two liquid phases at the time of separation is not essential. Other methods are possible for the separation, and here again the low solubility of the cyanide complexes is particularly advantageous. Examples of such other separation methods are:

The two-phase system is left standing until one of the two phases has completely solidified. The other can then be drawn off easily without special filtering devices. If the solid phase is then melted again, a sufficient quantity of a hydrocarbon solvent is added and the crystallising phase is again allowed to freeze, the last fractions of the other phase can also be extracted from the solid phase. According to another possibility, however, it is also possible to operate from the start in the presence of excess solvent for the metal ethyl compound not combined in complex form and then to cause all the aluminum complex compound to crystallise. In this case, the solution of the metal alkyl, that is to say, for example of the lead tetraethyl, can be readily separated by filtration from the crystals and, upon washing the crystal magma with a certain quantity of solvent, this is also freed from the last residue of the free metal ethyl. It is just this form of the invention which is most simple, apart from the liquid-liquid separation initially described. Finally, the metal ethyl compound not combined in complex form can if necessary also be distilled off from the aluminum complex by careful distillation.

Although a quite considerable improvement in the separation is produced by these alkali cyanide complexes of the aluminum triethyl according to the invention, an even greater reduction of the solubility of the lead tetraethyl in the phase of the liquid complex compound of the aluminum triethyl is possible if a certain quantity of the fluoride complex NaF·2Al($C_2H_5$)$_3$ is admixed with the cyanide complexes which have been described. The melting point of the 1:2-cyanide complex, which is at approximately 30° C., can be quite considerably lowered by adding such a 1:2-fluoride complex. Quantities of the 1:2-fluoride complex in the order of magnitude from 5 to 20% are quite sufficient for this purpose. Such mixtures generally remain liquid down to 0° C. and even lower. By adding the sodium fluoride complex, the solubility of the lead tetraethyl in liquid complex compounds, the phase is only increased to an insignificant degree, but it is nevertheless possible to reduce the temperature very much further and thus lessen the solubility to a very much greater degree.

This embodiment of the invention is thus characterised by the fact that limited quantities of the 1:2-alkali fluoride complex of aluminum triethyl are added to the mixture of aluminum triethyl combined in the cyanide complex and metal alkyl not combined in complex form, the mixture is lowered to temperatures of 0° C. and lower and then the two phases are separated from one another. It is also possible to proceed according to the invention in such a way that components containing cyanide and fluoride are simultaneously supplied to the mixture containing free aluminum triethyl and the other metal ethyl compound. For example, the alkali cyanide or 1:1-alkali cyanide complex and alkali fluoride or 1:1-alkali fluoride complex of aluminum triethyl can simultaneously be supplied to the starting mixture which is still not combined in complex form so permitting the corresponding 1:1-complex compounds to develop, then cooling to temperatures of 0° C. and lower and thereafter separating the phases from one another.

It is possible when using this form of the invention eventually to obtain a complex phase containing only fractions of a percent of metal ethyl compound, for example lead tetraethyl. These residues can then be eliminated with very small expenditure of extraction agents. However, it is possible to dispense entirely with the separation thereof, if it is for example desired thereafter to convert the aluminum complex compound containing lead tetraethyl into the alkali aluminum tetraethyl complex compound, in order to use the latter again, for example in the initial electrolysis as an electrolyte. With such a conversion, any traces of lead tetraethyl which may be present are completely decomposed with separation of lead, so that also in such a case, if aluminum ethyl complex compounds are supplied for this regeneration to the original electrolyte, which compounds still contain some lead tetraethyl, a lead-free electrolyte can still be supplied again to the electrolysis stage. This is particularly important when working with an electrolysis cell without a mercury cathode.

If desired, the alkali cyanide-aluminum triethyl complex compound can however also be subjected to thermal cracking. By this means, aluminum triethyl is liberated and it is in fact possible in this case for the two molecules of aluminum triethyl to be distilled off without any difficulty from the complex, so that the alkali cyanide remains as distillation residue.

For the conversion of the free aluminum triethyl to the corresponding complexes containing fluoride or cyanide, it is preferred according to the invention to employ moderately high temperatures. This conversion can easily be effected by heating the compounds to be reacted for a short time to a temperature from 50 to about 70° C.

The following examples further illustrate the invention:

EXAMPLE 1

A mixture of 456 g. of aluminum triethyl and 323 g. of lead tetraethyl, such as is formed on a lead anode by electrolysis of sodium-aluminum tetraethyl when using a mercury cathode, is mixed at 60° C. in a vessel filled with nitrogen and while stirring with 98 g. of dry sodium cyanide. After 30 minutes, all the sodium cyanide has dissolved and two-phase liquid mixture has formed. After separating both phases from one another at 30° C. there are obtained 308 g. of lead tetraethyl (i.e. 95.4% of the theoretical), which had formed the lower layer, and 554 g. of the compound NaCN.2Al($C_2H_5$)$_3$, which still contained 15 g. of lead tetraethyl dissolved therein.

EXAMPLE 2

49 g. of sodium cyanide are added to a mixture of 228 g. of aluminum triethyl and 123 g. of zinc diethyl at 60° C. while stirring. Within 15 minutes, all of the sodium cyanide has dissolved. 400 cc. of anhydrous and air-free hexane are added and there are obtained two liquid phases which are separated from one another after settling and cooling to 20° C. The lower layer is practically pure sodium cyanide, 2-aluminum triethyl with a very small content of zinc diethyl, and the upper phase is a hexane solution of zinc diethyl, from which it is possible, after evaporating the hexane, to obtain 120 g. of zinc diethyl (i.e. 97.5% of the calculated quantity).

Instead of the hexane, it is also possible with advantage to use liquid propane or butane under pressure. These hydrocarbons are particularly good extracting agents for zinc diethyl and they can be distilled off with particular ease from the zinc diethyl because of their low boiling points.

The complex compound $NaCN.2Al(C_2H_5)_3$, which still contains small quantities of zinc diethyl dissolved therein, is heated to 100° C. in a vacuum of $10^{-3}$ mm. Hg, and all the zinc diethyl distills off together with aluminum triethyl. After a total of about 20 to 30 cc. of liquid have distilled off, the receiver is changed and thereafter heated gradually up to 200° C. (measured in the complex salt melt). Within a few hours, 200 g. of aluminum triethyl distill off (i.e. 88% of the calculated quantity). The distillation residue is a pure sodium cyanide—in a quantity of 49 g. (i.e. 100% of the calculated quantity)— which can be used for a fresh separation of a metal ethyl-aluminum triethyl mixture.

EXAMPLE 3

98 g. of dry sodium cyanide are added at 60° C. and while stirring to a mixture of 456 g. of aluminum triethyl and 323 g. of lead tetraethyl. After all the sodium cyanide has dissolved, a 2-phase liquid mixture has been formed. After the two phases have settled, the temperature is lowered to 0° C., the upper phase (the complex salt melt) solidifying. The lower phase, which is pure lead tetraethyl in a quantity of 310 g., is now drawn off, 200 cc. of dry isooctane are added while stirring to the complex salt $NaCN.2Al(C_2H_5)_3$ melted at 50 to 60° C. and, after settlement, the two-phase mixture forming by the addition of isooctane is again allowed to cool to 0° C. The complex compound now crystallises and forms the lower layer. 550 g. of pure sodium cyanide-aluminum triethyl (1:2) is obtained, from which the isooctane, in which about 10 g. of lead tetraethyl are dissolved, is separated by decanting. The lead tetraethyl remaining after the isooctane has distilled off is combined with the main quantity and purified by steam distillation.

EXAMPLE 4

98 g. of dry sodium cyanide are added at 80° C. and while stirring to a mixture of 342 g. of aluminum triethyl and 296 g. of bismuth triethyl. Within 30 minutes, all the potassium cyanide has dissolved. 700 cc. of anhydrous and air-free isooctane are added to the reaction mixture and this is allowed to cool while stirring to 0° C. A crystal magma is obtained, from which the liquid is drawn off through a fitted glass filter, and the crystals are again washed with 200 cc. of cold isocyanate. The crystals are pure $KCN.2Al(C_2H_5)_3$; yield: 400 g. (=91% of the theoretical). The isooctane is distilled off from the liquid at 100° C. and the distillation residue is bismuth triethyl, which is purified by vacuum distillation at 2 mm. Hg and 50° C. (measured in the vapour). There are obtained 290 g. of bismuth triethyl, this representing 98% of the calculated quantity. The small distillation residue consists of the complex compound $$KCN.2Al(C_2H_5)_3$$

and can be added to the main quantity after being washed with a small quantity of isooctane.

The isooctane can be replaced by any saturated hydrocarbon, for example hexane, hexahydrotoluene, hexahydrocumene, decalin or mixtures of such hydrocarbons, for example benzine fractions.

What is claimed is:

1. A process of separating aluminum triethyl from its admixture with a metal ethyl compound $(C_2H_5)_nM$, wherein M is a metal selected from the group consisting of metals of groups II–V of the Periodic System other than aluminum and $n$ is an integer equal to the valence of said metal M, which comprises contacting said admixture with sufficient MeCN, where Me represents an alkali metal to form the complex $MeCN.2Al(C_2H_5)_3$, and thereafter admixing the resulting mixture of metal ethyl compound and $MeCN.2Al(C_2H_5)_3$ with $MeF.2Al(C_2H_5)_3$, cooling the resulting mixture of two immiscible liquid phases formed, and thereafter separately recovering the two phases.

2. Process according to claim 1, which comprises effecting said cooling down to a temperature of 0° C.

3. Process according to claim 1, which comprises admixing the mixture of metal ethyl and $$MeCN.2Al(C_2H_5)_3$$

with 5 to 20% of said $MeF.2Al(C_2H_5)_3$ complex compound.

4. A process of separating aluminum triethyl from its admixture with a metal ethyl compound $(C_2H_5)_nM$, wherein M is a metal selected from the group consisting of metals of groups II–V of the Periodic System other than aluminum and $n$ is an integer equal to the valence of said metal M, which comprises contacting said admixture with a mixture composed of a member selected from the group consisting of $MeF.Al(C_2H_5)_3$ wherein Me represents an alkali metal with a member selected from the group consisting of MeCN and $$MeCN.Al(C_2H_5)_3$$

in a sufficient amount to form a 1:2 complex compound of said aluminum triethyl, said metal ethyl compound being sparingly soluble in the said complex, and recovering the metal ethyl compound which separates as a separate phase from the aluminum triethyl complex compound.

References Cited

UNITED STATES PATENTS

| | | | |
|---|---|---|---|
| 2,844,615 | 7/1958 | Ziegler | 260—448 |
| 3,088,957 | 5/1963 | McKay | 260—437 |

TOBIAS E. LEVOW, Primary Examiner

H. M. S. SNEED, Assistant Examiner

U.S. Cl. X.R.

260—429, 429.3, 429.5, 429.7, 429.9, 431, 437, 446, 447